United States Patent
Brown et al.

(10) Patent No.: US 10,378,636 B2
(45) Date of Patent: Aug. 13, 2019

(54) REPAIRING A GEAR PART IN A WIND TURBINE

(71) Applicant: Vestas Wind Systems A/S, Aarhus N. (DK)

(72) Inventors: Nicholas Brown, Portland, OR (US); David Grossen, Hillsboro, OR (US)

(73) Assignee: Vesta Wind Systems A/S, Aarhus N. (DK)

( * ) Notice: Subject to any disclaimer, the term of this patent is extended or adjusted under 35 U.S.C. 154(b) by 312 days.

(21) Appl. No.: 15/513,328

(22) PCT Filed: Sep. 22, 2015

(86) PCT No.: PCT/DK2015/050288
§ 371 (c)(1),
(2) Date: Mar. 22, 2017

(87) PCT Pub. No.: WO2016/062315
PCT Pub. Date: Apr. 28, 2016

(65) Prior Publication Data
US 2017/0241535 A1 Aug. 24, 2017

Related U.S. Application Data

(60) Provisional application No. 62/068,350, filed on Oct. 24, 2014.

(30) Foreign Application Priority Data

Dec. 16, 2014 (DK) .................................. 2014 70787

(51) Int. Cl.
*F16H 55/12* (2006.01)
*F16H 55/17* (2006.01)
(Continued)

(52) U.S. Cl.
CPC ............. *F16H 55/12* (2013.01); *B23B 49/02* (2013.01); *B23P 6/00* (2013.01); *B23P 15/14* (2013.01);
(Continued)

(58) Field of Classification Search
CPC .......... F16H 55/12; F16H 15/00; F03D 80/50; B23P 15/14
See application file for complete search history.

(56) References Cited

U.S. PATENT DOCUMENTS

| 1,323,962 A | 12/1919 | Byers |
| 1,384,623 A | 7/1921 | Meredith |

(Continued)

FOREIGN PATENT DOCUMENTS

| CN | 102962629 A | 3/2013 |
| EP | 0008851 A1 | 3/1980 |

(Continued)

OTHER PUBLICATIONS

The State Intellectual Property Office of China, Office Action in CN Application No. 2018062602138630, dated Jun. 29, 2018.
(Continued)

*Primary Examiner* — David M Fenstermacher
(74) *Attorney, Agent, or Firm* — Wood Herron & Evans LLP

(57) ABSTRACT

A method for repairing a gear part (1) in a wind turbine, in particular repairing damaged teeth of a toothed rim (2). A repair cavity (10) is formed by removing material, including one or more damaged teeth, from the gear part (1) by drilling one or more holes through the gear part (1) along a direction which is substantially parallel to an axis of circular symmetry of the gear part (1). A repair segment (15) comprising one or more replacement gear teeth (16), and having a geometry which matches a geometry of the repair cavity (10), is
(Continued)

arranged in the repair cavity (10), and attached to the gear part (1) by introducing one or more fasteners (17) into fastener openings (11, 13, 14) formed in the gear part (1).

18 Claims, 8 Drawing Sheets

(51) Int. Cl.
    *F03D 15/00*     (2016.01)
    *F03D 80/50*     (2016.01)
    *B23B 49/02*     (2006.01)
    *B23P 6/00*     (2006.01)
    *B23P 15/14*     (2006.01)
    *F03D 7/02*     (2006.01)

(52) U.S. Cl.
    CPC ............ *F03D 15/00* (2016.05); *F03D 80/50* (2016.05); *F16H 55/17* (2013.01); *F03D 7/0224* (2013.01); *F05B 2230/80* (2013.01); *F16H 2055/175* (2013.01)

(56) References Cited

U.S. PATENT DOCUMENTS

| | | | |
|---|---|---|---|
| 1,648,550 A | | 11/1927 | Kantor |
| 3,175,419 A | * | 3/1965 | Horton .................... D03D 51/00 74/443 |
| 3,225,616 A | * | 12/1965 | Whitehead .............. F16H 55/12 74/445 |
| 3,439,551 A | * | 4/1969 | Militana ................. F16H 55/12 474/162 |
| 4,111,064 A | * | 9/1978 | Purcell .................... F16H 55/12 474/162 |
| 4,241,619 A | * | 12/1980 | Cerny ..................... F16H 55/18 101/248 |
| 4,384,865 A | * | 5/1983 | Ueno ....................... B62M 9/10 474/160 |
| 4,465,411 A | | 8/1984 | Boyce, Jr. |
| 5,194,031 A | * | 3/1993 | Sahler .................... A63H 31/00 446/103 |
| 5,347,880 A | * | 9/1994 | Kallenberger .......... F16H 55/12 29/239 |
| 5,704,248 A | * | 1/1998 | Knotts ...................... F16H 1/12 248/562 |
| 8,287,238 B2 | | 10/2012 | DiMascio |
| 2012/0090415 A1 | * | 4/2012 | Lim ........................ F16H 19/04 74/89.17 |
| 2014/0112789 A1 | * | 4/2014 | Noirot ................... F03D 7/0224 416/147 |
| 2014/0112790 A1 | * | 4/2014 | Noirot ................... F16C 33/581 416/147 |

FOREIGN PATENT DOCUMENTS

| | | |
|---|---|---|
| ES | 2437199 A2 | 1/2014 |
| SU | 1581943 A1 | 7/1990 |
| WO | 2004001223 A1 | 12/2003 |

OTHER PUBLICATIONS

European Patent Office, International Search Report and Written Opinion in PCT Application No. PCT/DK2015/050288, dated Apr. 19, 2016.

Danish Patent and Trademark Office, Search Opinion in PA 2014 70787, dated Mar. 4, 2015.

\* cited by examiner

REPAIRING A GEAR PART IN A WIND TURBINE

FIELD OF THE INVENTION

The present invention relates to a method for repairing a gear part in a wind turbine, such as a gear part of a yaw system or a gear part of a pitch system of a wind turbine. The invention further relates to a gear part which has been repaired by means of the method, and to a jig used when performing the method.

BACKGROUND OF THE INVENTION

Gear parts in wind turbines, such as gear parts in yaw systems or gear parts in pitch systems, normally comprise a toothed rim arranged to engage with a toothed rim of another gear part during operation. Sometimes one or more of the teeth of the toothed rim become damaged, and it is necessary to repair or replace the gear part. Replacing the gear part is undesirable, since this is very expensive, and may require that large components of the wind turbine are dismantled in order to allow the damaged gear part to be removed and a new gear part to be installed.

As an alternative, the damaged gear part may be repaired on site, i.e. without removing the damaged gear part from the wind turbine. U.S. Pat. No. 8,287,238 B2 discloses a method for repairing a hub pitch gear assembly. The method includes providing a ring assembly for adjusting a pitch angle of a wind turbine blade having a plurality of gear teeth. A segment of the ring assembly is removed, e.g. through milling, the segment including at least a portion of at least one gear tooth, to form a repair cavity. A repair segment configured to mate the repair cavity is provided and the repair segment is directed into the repair cavity and fastened in position.

DESCRIPTION OF THE INVENTION

It is an object of embodiments of the invention to provide a method for repairing a gear part in a wind turbine, which can be performed without the use of specialized equipment and/or specialized skills.

It is a further object of embodiments of the invention to provide a method for repairing a gear part in a wind turbine, which can be performed in an easy and cost effective manner.

It is an even further object of embodiments of the invention to provide a jig for use in repairing gear part in a wind turbine, the jig allowing repair of the gear part to be performed in an easy and cost effective manner.

According to a first aspect the invention provides a method for repairing a gear part in a wind turbine, the gear part comprising a toothed rim, and the gear part defining an axis of circular symmetry, the method comprising the steps of:

removing material from the gear part, including one or more damaged teeth of the toothed rim, by drilling one or more holes through the gear part along a direction which is substantially parallel to the axis of circular symmetry, thereby forming a repair cavity in the gear part, providing at least one fastener opening in the gear part by drilling one or more holes and/or one or more recesses in the gear part, providing a repair segment having a geometry which matches a geometry of the repair cavity, the repair segment comprising one or more replacement gear teeth, arranging the repair segment in the repair cavity, and attaching the repair segment to the gear part by introducing one or more fasteners into the fastener opening(s).

According to the first aspect the invention provides a method for repairing a gear part in a wind turbine. In the present context the term 'gear part' should be interpreted to mean an item which forms part of a gear system in a wind turbine. The gear part could, e.g., be a gear wheel or a toothed ring. The gear system may, e.g., be a yaw system or a pitch system.

The gear part comprises a toothed rim, preferably comprising a plurality of teeth. The teeth of the toothed rim are arranged to engage with teeth arranged on another gear part of the gear system. As described above, the teeth of the toothed rim may become damaged during operation of the gear system, due the engagement with the teeth of the other gear part.

The gear part defines an axis of circular symmetry. This should be interpreted to mean that the gear part is circular symmetric with respect to the axis of circular symmetry. For instance, the gear part may be a substantially circular disk with the toothed rim arranged at the circular edge of the disk. As an alternative, the gear part may be a circular ring with the toothed rim arranged at an inner or outer surface of the circular ring. During operation the gear part may advantageously perform rotating movements about the axis of circular symmetry.

According to the method of the first aspect of the invention, material is initially removed from the gear part. This includes removing one or more damaged teeth of the toothed rim. The one or more teeth being removed from the gear part may have been damaged during operation of the gear system in the manner described above. Often, when one tooth has been damaged, one or both of the neighbouring teeth will also have been damaged, and it may therefore be desirable to remove two or more teeth from the gear part. However, it is not ruled out that only one damaged tooth is removed.

The removal of the material from the gear part is performed by drilling one or more holes through the gear part along a direction which is substantially parallel to the axis of circular symmetry. Drilling is a very easy process for removing material, which does not require special equipment or special skills of the person performing the drilling. Performing the drilling along a direction which is substantially parallel to the axis of circular symmetry, allows the drilling to be performed 'from above' or 'from below' a circular disk or ring forming the gear part, rather than along a radial direction, being substantially perpendicular to the axis of circular symmetry. This allows the damaged teeth to be removed from the gear part in an easy and precise manner. Furthermore, the amount of material being removed can be controlled precisely by selecting a specific size of the drill bit used for the drilling, since material is removed by the drill bit along the entire thickness of the gear part, with a cross sectional area defined by the size of the drill bit, and the number of holes being drilled.

When the material has been removed from the gear part in the manner described above, a repair cavity has been formed in the gear part.

Furthermore, at least one fastener opening is provided in the gear part by drilling one or more holes and/or one or more recesses in the gear part. Each fastener opening is arranged to receive a suitable kind of fastener. This will be described in further detail below. The holes may be in the form of through-going holes extending through the gear part, or they may extend only partly through the gear part. The fastener opening(s) may be provided with an inner thread. In this case screws or bolts may be used as fasteners.

Next, a repair segment is provided. The repair segment has a geometry which matches a geometry of the repair cavity. Thus, the repair segment fits into the repair cavity. The repair segment further comprises one or more replacement gear teeth. The number of replacement gear teeth of the repair segment matches the number of damaged teeth which have been removed from the gear part. Thereby the replacement gear teeth of the repair segment can replace the damaged gear teeth which have been removed from the gear part. This will be described in further detail below.

The repair segment may, e.g., be a standard component. In this case the step of removing material from the gear part will always be performed in such a manner that the resulting repair cavity has a size and shape which matches the size and shape of the standard repair segment, thereby making it even easier for a person without special skills to perform the repair. This may include removing teeth which have not been damaged if the number of adjacently positioned damaged teeth is lower than the number of replacement teeth of the standard repair segment. In the case that the number of adjacently positioned damaged teeth is higher than the number of replacement teeth of the standard repair segment, two or more repair segments may be used, and two or more matching repair cavities may be provided in the gear part.

The repair segment is then arranged in the repair cavity. Since the geometry of the repair segment matches the geometry of the repair cavity, the repair segment is fitted precisely into the repair cavity. Furthermore, the replacement teeth of the repair segment are positioned in such a manner that they form part of the toothed rim of the gear part, thereby replacing the damaged teeth which have been removed from the gear part.

Finally, the repair segment is attached to the gear part by introducing one or more fasteners into the fastener opening(s). The repair segment may comprise corresponding fastener opening(s), arranged to receive the fastener(s). Thereby the fastener(s) fix(es) the repair segment to the gear part, retaining it securely in the repair cavity. Accordingly, the repair segment is attached to the gear part at a position where the replacement teeth of the repair segment replace the damaged teeth which have been removed, the replacement teeth thereby forming part of the toothed rim.

The step of removing material from the gear part may comprise drilling two or more holes through the gear part along a direction which is substantially parallel to the axis of circular symmetry, the two or more holes being arranged in abutment with each other or with an overlap, the two or more holes thereby forming a single repair cavity in the gear part. According to this embodiment, a repair cavity is formed which has a shape which is defined by the circular shapes of the drilled holes, and by the relative positions of the holes. Such a repair cavity may be very well defined, and may therefore be suitable for receiving a standard repair segment, as described above.

As an alternative, only one hole may be drilled.

The step of providing at least one fastener opening in the gear part may comprise drilling one or more holes and/or one or more recesses in the gear part along a direction which is substantially parallel to the axis of circular symmetry.

According to this embodiment, the fastener opening(s) is/are provided by drilling along the same direction as the direction of the drilling applied when forming the repair cavity. As described above, this allows the drilling of the fastener opening(s) to be performed in an easy and accurate manner, without requiring special equipment or special skills of the person performing the drilling. The drilling of the fastener opening(s) may even be performed using the same drilling equipment which is used for removing material from the gear part, thereby forming the repair cavity.

The step of providing at least one fastener opening in the gear part may, in this case, comprise drilling one or more recesses in the gear part, said one or more recesses forming part of the repair cavity. According to this embodiment, the repair cavity comprises a through-going portion, which extends entirely through the thickness of the gear part, and a portion which only extends partly through the thickness of the gear part. The through-going portion has been provided during the removal of material from the gear part, including the one or more damaged teeth. Thus, the damaged teeth have been completely removed along the entire thickness of the gear part. The portion extending partly through the thickness of the gear part has been provided by the recesses formed as part of the fastener opening(s), i.e. it forms part of a region where the repair segment is attached to the gear part by means of the fastener(s). According to this embodiment, the repair segment has a geometry which also matches the portion of the repair cavity being formed by the one or more recesses.

The step of providing at least one fastener opening in the gear part may comprise providing a fastener opening having a first diameter and a recess having a second diameter, the second diameter being larger than the first diameter, the fastener opening and the recess being provided in a single drilling step, and the single drilling step being stopped when the recess has a predefined depth.

Preferably, the fastener opening is arranged inside the recess, e.g. concentrically with respect to the recess, and the fastener opening is preferably deeper than the recess. The fastener opening may, e.g., be a through-going opening, extending through the entire thickness of the gear part. Alternatively, the fastener opening may extend only partly through the thickness of the gear part.

The recess allows the repair segment to be mounted flush with an upper or lower surface of the gear part, while allowing the repair segment to be attached to the gear part via fasteners inserted into the fastener openings.

Providing the fastener opening and the recess in a single drilling step allows the fastener opening and the recess to be provided in an easy and precise manner. In particular, it can easily be ensured that the fastener opening and the recess are positioned accurately relative to each other. This may, e.g., be obtained by performing the drilling using a step spade drill.

Since the drilling is stopped when the recess has a predefined depth, it is ensured that the recess is provided in a very accurate manner, without requiring special skills or the person performing the drilling. For instance, the predefined depth of the recess may correspond to the thickness of a part of the repair segment which is supposed to be arranged at a position corresponding to the position of the recess. In this case a surface of the repair segment will be arranged flush with a surface of the gear part when the repair segment is arranged in the repair cavity.

Alternatively or additionally to providing the fastener opening(s) by drilling along a direction which is substantially parallel to the axis of circular symmetry, one or more additional fastener openings may be provided by drilling along a different direction, for instance substantially perpendicular to the axis of circular symmetry.

The method may further comprise the steps of:
providing a jig comprising one or more guiding apertures,
mounting the jig on the gear part in a region containing damaged gear teeth of the toothed rim, while aligning the jig with respect to undamaged gear teeth of the toothed rim,
performing the steps of removing material from the gear part and providing at least one fastener opening in the gear part by drilling through the guiding aperture(s) of the jig, and
removing the jig from the gear part after the steps of removing material from the gear part and providing at least one fastener opening in the gear part have been performed.

In the present context, the term 'jig' should be interpreted to mean a device which provides guidance during a drilling operation regarding where to position the drill bit on the gear part. To this end the jig comprises one or more guiding apertures for guiding a drill during the drilling operation. The jig may be regarded as a drilling template.

According to this embodiment, the jig is mounted on the gear part in a region containing damaged teeth of the toothed rim. Accordingly, the jig is mounted in a region where repair is needed, and drilling is therefore to be performed in order to remove the damaged teeth and form a repair cavity. Furthermore, the jig is aligned with respect to undamaged gear teeth of the toothed rim.

Then the steps of removing material from the gear part and providing at least one fastener opening in the gear part are performed by drilling through the guiding apertures. Accordingly, the drill is guided by means of the guiding apertures of the jig. Thereby the size and shape of the resulting repair cavity is accurately controlled.

Furthermore, due to the alignment of the jig with respect to the undamaged teeth of the toothed rim, it is ensured that the repair cavity is aligned with respect to the undamaged gear teeth in such a manner that the teeth of a repair segment mounted in the repair cavity are aligned with the undamaged teeth of the toothed rim to accurately replace the damaged teeth and restore the toothed rim.

Once the drilling steps have been performed, the jig is removed from the gear part, in order to allow the repair segment to be mounted in the repair cavity.

In the case that one or more additional fastener openings are provided, e.g. by drilling along a direction which is substantially perpendicular to the axis of circular symmetry, the repair segment may be used as a jig for drilling this or these opening(s).

The method may further comprise the step of removing sharp edges from an inner surface of the repair cavity, by means of grinding or polishing, after the step of removing material from the gear part and prior to the step of arranging the repair segment in the repair cavity. According to this embodiment, the repair cavity is finalized after the drilling steps by means of grinding or polishing in order to provide a smoother inner surface of the repair cavity and in order to provide a repair cavity with a geometry and proper fit which matches a geometry of a repair segment.

It should be noted that the major part of the material being removed from the gear part in order to form the repair cavity is removed during the drilling step described above, and that the grinding or polishing step is only to be regarded as fine tuning of the repair cavity.

The step of removing material from the gear part may be performed using an annular cutter drill. In the present context the term 'annular cutter drill bit' should be interpreted to mean a drill bit having a cup-like shape, and where a cutting surface of the drill is arranged along an annular edge of the cup-like drill bit. Thereby, when cutting operations are performed using an annular cutter drill bit, a cylindrical piece of material is removed from the work piece being cut. This allows the damaged teeth to be removed in a precise manner, because an annular cutting drill bit is capable of drilling at an edge with high precision and without drifting or deflecting. Furthermore, this minimises the amount of dust-like drilling waste produced during the drilling process.

After the drilling using the annular cutter drill bit has been performed, the cylindrical drilling core resulting from the drilling operation may be removed using a chisel and a hammer.

In the present context, the term 'drill bit' should be interpreted as a cutting tool for making cylindrical holes in a material and generally not suitable for other material removal operations such as milling. This means that an annular cutter drill bit is a specific type of drill bit, as described above.

The gear part may form part of a yaw system of a wind turbine. In the present context the term 'yaw system' should be interpreted to mean a system which interconnects a tower and a nacelle of a wind turbine, in such a manner that the nacelle is allowed to rotate relative to the tower in order to direct a rotor mounted on the nacelle into the wind. According to this embodiment the gear part may advantageously be a yaw ring, i.e. a large toothed ring which is mounted on an upper part of the tower or on a lower part of the nacelle. It is typically very difficult and expensive to replace a yaw ring of a wind turbine, because this requires that large components of the wind turbine are dismantled. It is therefore an advantage to repair a yaw ring by using a method according to the invention, because the yaw ring can thereby be repaired on site, i.e. without removing the yaw ring from the wind turbine. Accordingly it is not necessary to dismantle large components of the wind turbine.

As an alternative, the gear part may form part of a pitch system of a wind turbine. In the present context the term 'pitch system' should be interpreted to mean a system which interconnects a hub and a blade of a wind turbine, in such a manner that the blade is allowed to rotate relative to the hub in order to adjust an angle of attack of the wind turbine blade with respect to the wind. It is also typically very difficult and expensive to replace a gear part of a pitch system, because it may require that large components, such as a wind turbine blade, are dismantled. It is therefore an advantage to repair a gear part of a pitch system by using a method according to the invention, because the gear part can thereby be repaired on site, and without removing the wind turbine blade or other large components of the wind turbine.

According to a second aspect the invention provides a repaired gear part for a wind turbine, the gear part comprising:
a toothed rim,
a repair cavity formed in the gear part, said repair cavity defining at least one rounded contour formed by a drill, and
a repair segment mounted in the repair cavity and attached to the gear part by means of one or more fasteners, the repair segment having a shape and a size which matches the at least one rounded contour of the repair cavity, and the repair segment comprising one or more replacement gear teeth.

Since the repair cavity defines at least one rounded contour formed by a drill, the repair cavity may have been formed mainly or solely by a drilling process, e.g. in the manner described above.

The repair cavity may define two or more rounded contours, each formed by a drill, the two or more rounded contours being arranged in abutment with each other or with an overlap. According to this embodiment, the repair cavity may have been formed by drilling two or more holes in the gear part, e.g. in the manner described above.

The at least one rounded contour(s) may form at least 40% of a surface of the repair cavity, such as at least 45% of a surface of the repair cavity, such as at least 50% of a surface of the repair cavity, such as at least 60% of a surface of the repair cavity, such as at least 70% of a surface of the repair cavity, such as at least 80% of a surface of the repair cavity, such as at least 90% of a surface of the repair cavity, such as at least 95% of a surface of the repair cavity. According to this embodiment, the main part of the repair cavity has been formed by means of a drilling process.

The repaired gear part may have been repaired by means of a method according to the first aspect of the invention. Accordingly, the remarks set forth above are equally applicable here. The repaired gear part may form part of a yaw system of a wind turbine, or the repaired gear part may form part of a pitch system of a wind turbine. This has already been described above.

According to a third aspect the invention provides a jig for use in repairing a gear part in a wind turbine, the jig comprising:
  means for aligning the jig with gear teeth of a gear part to be repaired,
  at least one guiding aperture arranged for guiding a drill, and
  means for mounting the jig on a gear part to be repaired in a position where the guiding aperture(s) is/are arranged in a region comprising one or more damaged teeth of the gear part.

It should be noted that a person skilled in the art would readily recognise that any feature described in combination with the first aspect of the invention could also be combined with the second or third aspects of the invention, that any feature described in combination with the second aspect of the invention could also be combined with the first and third aspects of the invention, and that any feature described in combination with the third aspect of the invention could also be combined with the first or second aspects of the invention.

Thus, the jig according to the third aspect of the invention may advantageously be used for repairing a gear part using a method according to the first aspect of the invention, and the resulting repaired gear part may be a gear part according to the second aspect of the invention.

The jig according to the third aspect of the invention comprises at least one guiding aperture arranged for guiding a drill. Thus, the jig can be used for ensuring that drilling operations performed on a work piece, such as a gear part to be repaired, are performed in an accurate manner. This is obtained by drilling through the guiding apertures.

The jig further comprises means of aligning the jig with gear teeth of a gear part to be repaired, i.e. the jig can be positioned accurately on a gear part to be repaired, with respect to the gear teeth of the gear part. As described above with reference to the first aspect of the invention, this ensures that the a repair cavity being formed by drilling through guiding apertures of the jig are positioned accurately with respect to the gear teeth of the gear part, and in such a manner that gear teeth of a repair segment can replace damaged gear teeth in an appropriate manner, and in such a manner that a toothed rim of the gear part is restored.

Finally, the jig comprises means for mounting the jig on a gear part to be repaired in a position where the guiding aperture(s) is/are arranged in a region comprising one or more damaged teeth of the gear part. The means for mounting may, e.g., be in the form of one or more clamps. Thereby the damaged teeth can be removed from the gear part by drilling through the guiding apertures of the jig. Since the jig is mounted on the gear part by means of the means for mounting, the jig is prevented from moving relative to the gear part, e.g. during the drilling operation, and the drilling is thereby performed in an accurate manner.

The jig may comprise at least two guiding apertures, the at least two guiding apertures being arranged in abutment with each other or with an overlap. According to this embodiment, a single repair cavity is formed when drilling through the at least two guiding apertures. This has already been described above.

The means for aligning the jig may comprise a toothed rim arranged to be aligned with a toothed rim of a gear part, and the means for mounting the jig on a gear part to be repaired may be arranged to mount the jig in a position where the toothed rim of the jig is aligned with the toothed rim of the gear part. According to this embodiment, it can be visually inspected that the jig is mounted correctly on the gear part.

The at least one guiding aperture may define at least one rounded contour.

BRIEF DESCRIPTION OF THE DRAWINGS

The invention will now be described in further detail with reference to the accompanying drawings in which.

DETAILED DESCRIPTION OF THE DRAWINGS

FIGS. 1-4 illustrate various steps performed during repair of a gear part 1 using a method according to an embodiment of the invention.

Figure 1:
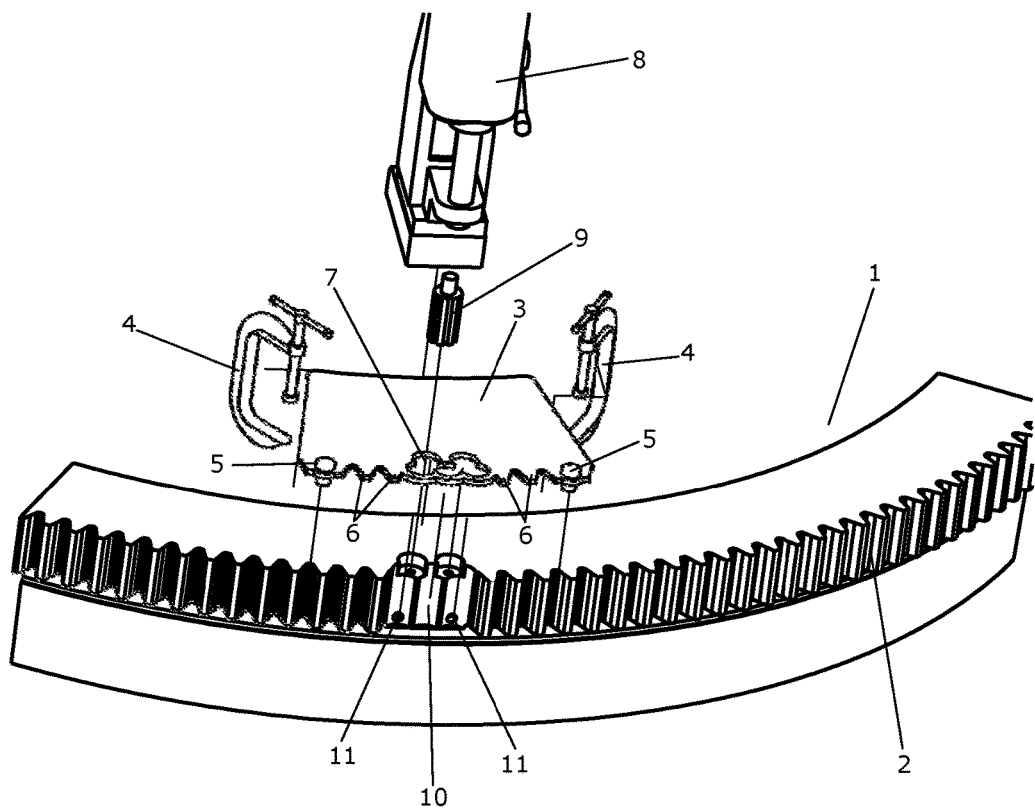
FIGS. 1-4 illustrate various steps performed during repair of a gear part using a method according to an embodiment of the invention.

FIG. 1 is a perspective view of a part of a gear part 1, in the form of a yaw ring. The gear part 1 comprises a toothed rim 2 comprising a plurality of gear teeth. Some of the gear teeth have been damaged, and in the gear part 1 of FIG. 1 these damaged teeth have been removed in the manner described below.

In order to remove the damaged teeth, a jig 3 is mounted on the gear part 1 by means of a set of clamps 4. When mounted on the gear part 1, the jig 3 is aligned with respect to the teeth of the toothed rim 2 by positioning each of two aligning members 5 arranged on the jig 3 between two teeth of the toothed rim 2. The jig 3 is further provided with a set of teeth 6 which match the teeth of the toothed rim 2. Thereby it can be visually inspected that the jig 3 is properly aligned with respect to the teeth of the toothed rim 2.

The jig 3 comprises a guiding aperture 7, defining a number of rounded contours. The guiding aperture 7 can be used for guiding drilling operations performed on the gear part 1, by drilling a number of holes in the gear part 1 through the guiding aperture 7, when the jig 3 is mounted on the gear part 1.

The jig 3 is further mounted on the gear part 1 in a position where the guiding aperture 7 is arranged adjacent to a region comprising the damaged teeth. Thereby the damaged teeth can be removed from the gear part 1 by drilling through the guiding aperture 7.

In FIG. 1 drilling equipment 8 and a drill bit 9 to be mounted on the drilling equipment 8 are shown. Once the jig 3 has been mounted on the gear part 1, five holes are drilled in the gear part 1, using the drilling equipment 8. Initially, three through-going holes are drilled in the gear part 1 by means of an annular cutter drill bit, through the part of the guiding aperture 7 which is closest to the toothed rim 2. Thereby the damaged teeth are removed from the gear part 1. The drilling is performed along a direction which is substantially parallel to an axis of circular symmetry of the gear part 1. The through-going holes may be drilled one at a time, and when one hole has been drilled, the hole may be cleaned with respect to the resulting drilling core and dust-like drilling waste. This ensures that the next hole can be drilled with great accuracy.

Next, two fastener openings are drilled in the gear part 1 by means of a step spade drill bit, through the part of the guiding aperture 7 which is furthest away from the toothed rim 2.

Each of the fastener openings comprises a recess and an opening arranged to receive a fastener. The drilling is performed along a direction which is substantially parallel to the axis of circular symmetry of the gear part 1.

As a result of the drilling operations described above, a repair cavity 10 comprising a number of rounded contours, corresponding to the rounded contours of the guiding aperture 7 of the jig 3, is provided. Two additional fastener openings 11 have been drilled along a direction which is substantially perpendicular to the axis of circular symmetry of the gear part 1.

In FIG. 1 the various parts described above are shown in an exploded manner, for instance the jig 3 is not mounted on the gear part 1. Furthermore, the gear part 1 is shown after the drilling operations have been performed, i.e. after the damaged teeth have been removed and the repair cavity 10 has been formed.

Figure 2:
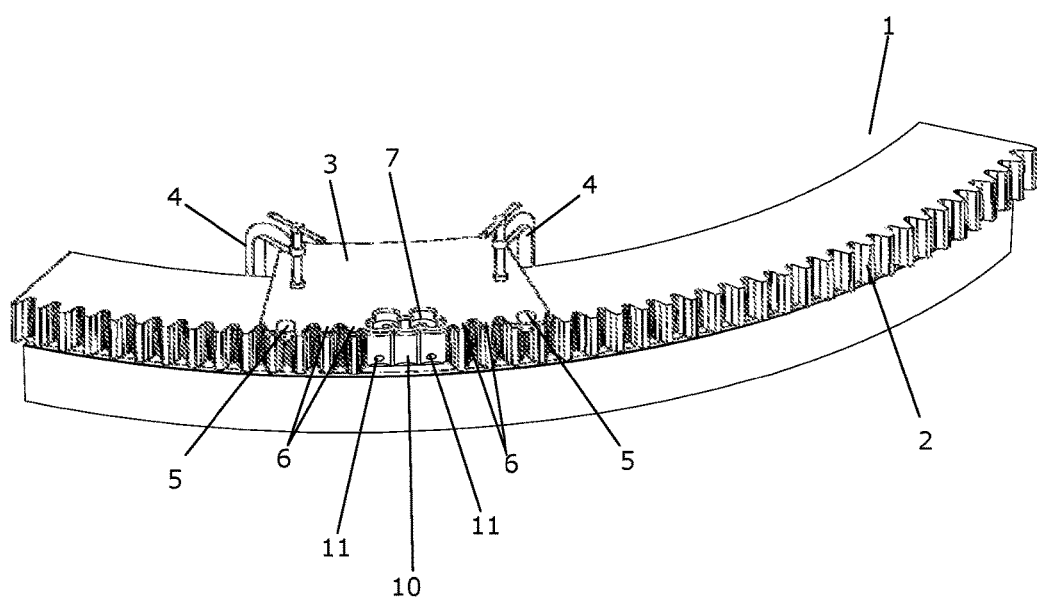

FIG. 2 is a perspective view of the gear part 1 of FIG. 1, with the jig 3 mounted on the gear part 1 in the manner described above. It can be seen that the jig 3 is aligned with respect to the teeth of the toothed rim 2, due to the aligning members 5, since the teeth 6 of the jig 3 are aligned with teeth of the toothed rim 2.

Figure 3:
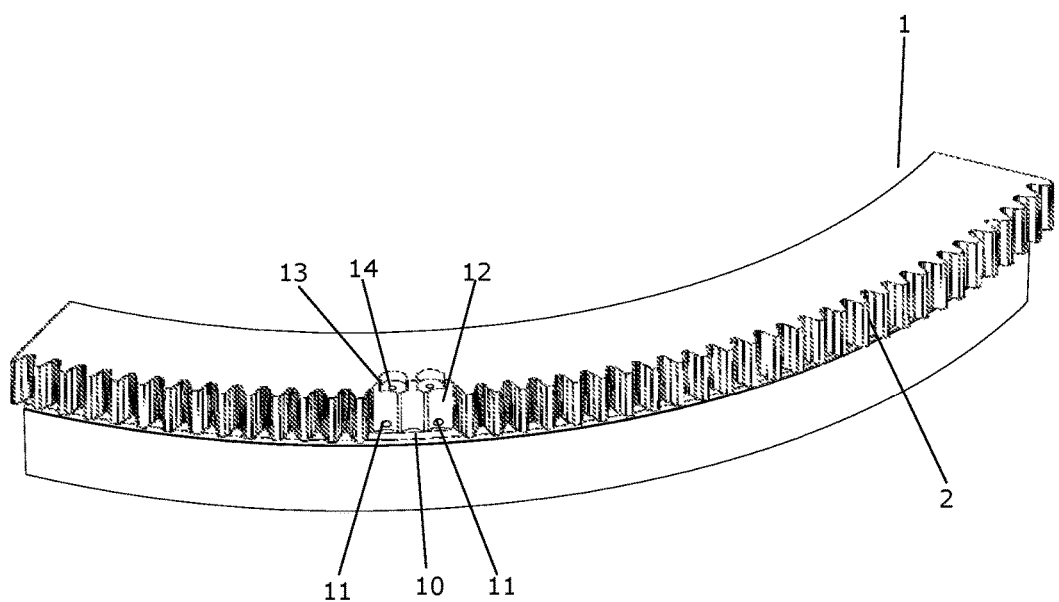

FIG. 3 is a perspective view of the gear part 1 of FIGS. 1 and 2. However, in FIG. 3 the jig 3 has been removed from the gear part 1, after the drilling has been performed. In FIG. 3 it can be easily seen that the repair cavity 10 comprises three rounded contours 12 originating from the three holes drilled by means of the annular cutter drill bit. The repair cavity 10 further comprises two recesses 13 and two fastener openings 14 originating from the two holes drilled by means of the step spade drill bit.

Figure 4:
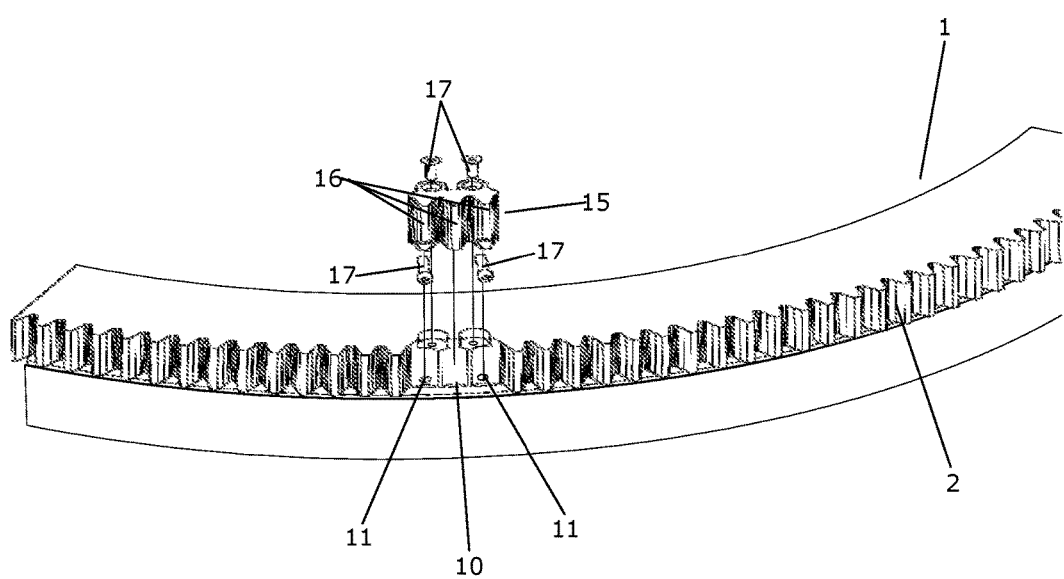

FIG. 4 is a perspective view of the gear part 1 of FIGS. 1-3. FIG. 4 further shows a repair segment 15 to be mounted in the repair cavity 10. The repair segment 15 has a geometry, i.e. a size and a shape, which matches the geometry of the repair cavity 10. Furthermore, the repair segment 15 comprises three replacement teeth 16. Four fasteners 17 for attaching the repair segment 15 to the gear part 1 are shown.

Figure 5:
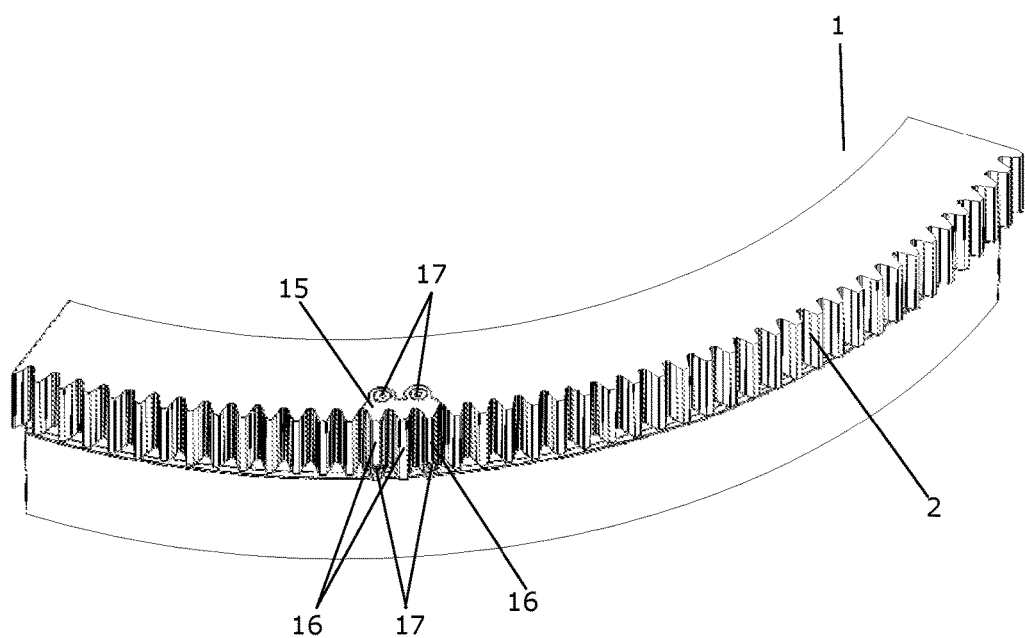
FIG. 5 is a perspective view of a repaired gear part according to an embodiment of the invention.

FIG. 5 is a perspective view of the gear part 1 of FIGS. 1-4, with the repair segment 15 mounted in the repair cavity. The fasteners 17 have been introduced into the fastener openings, thereby attaching the repair segment 15 to the gear part 1.

It can be seen that the repair segment 15 fits precisely into the repair cavity, and that it is mounted flush with an upper side of the gear part 1. Furthermore, the replacement teeth 16 of the repair segment 15 match the original size and shape of the damaged teeth, and therefore the replacement teeth 16 replace the damaged teeth, and the toothed rim 2 is thereby restored.

Thus, the gear part 1 of FIG. 5 is a repaired gear part 1.

Figure 6:
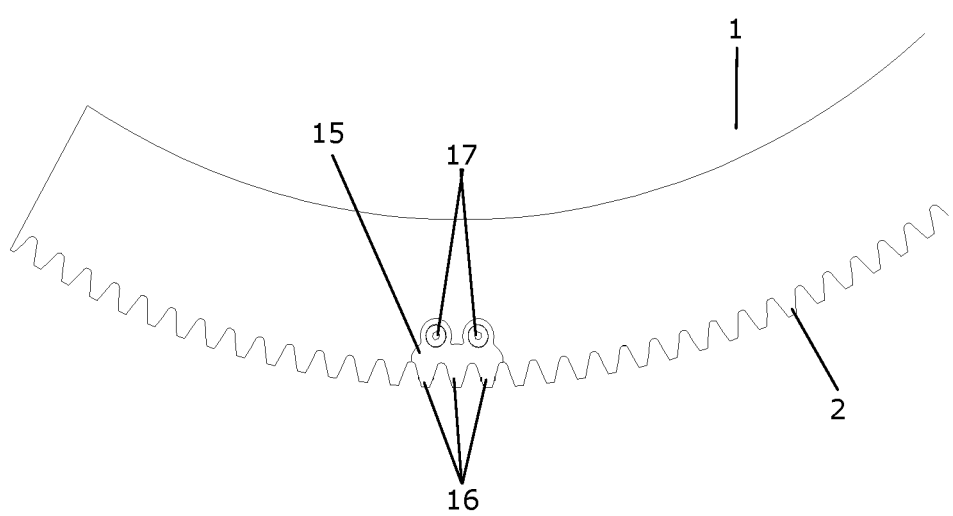
FIG. 6 is a top view of the repaired gear part of FIG. 5, and FIGS. 7-9 are perspective views of a repair segment for use when performing a method according to an embodiment of the invention, seen from various angles.

FIG. 6 is a top view of the repaired gear part 1 of FIG. 5.

Figure 7:
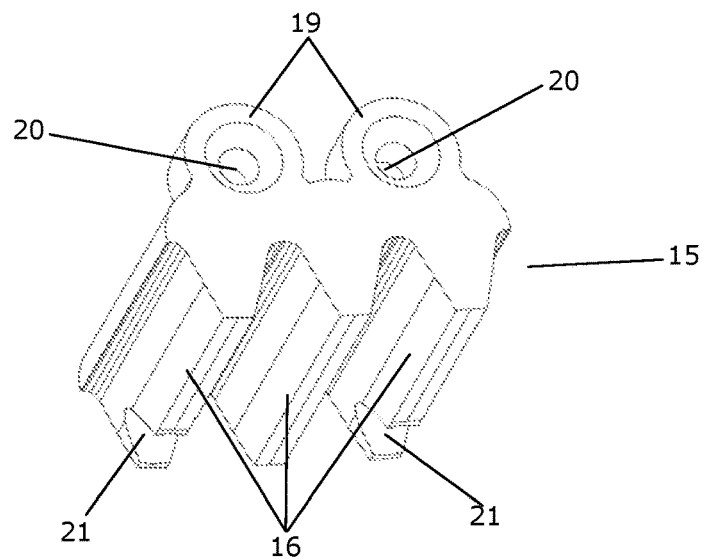
Figure 8:
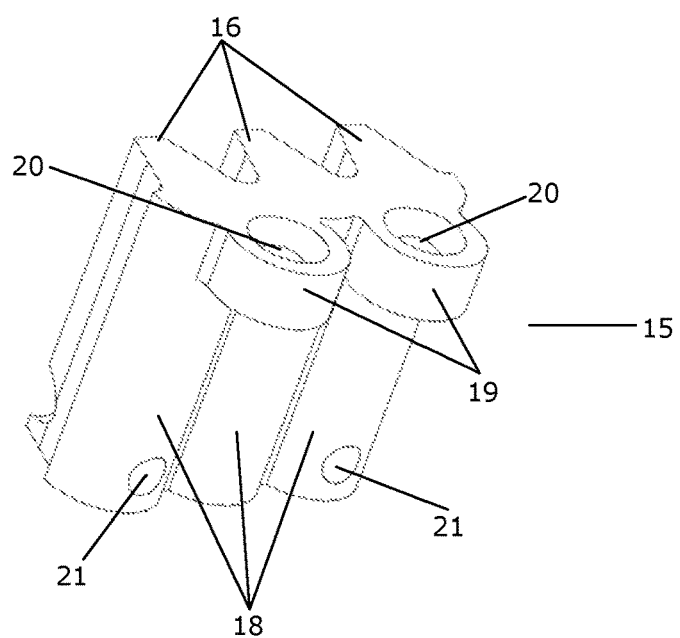
Figure 9:
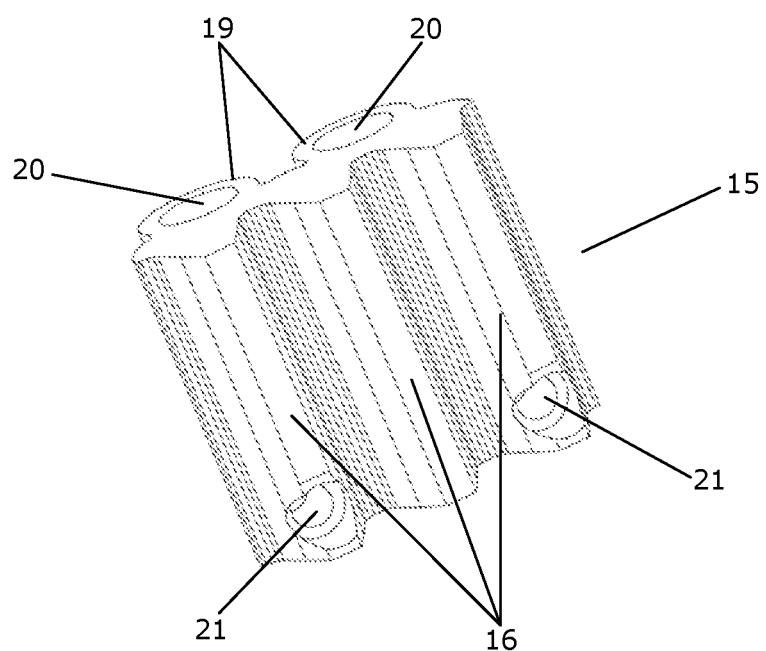

FIGS. 7-9 are perspective views of a repair segment 15 for use when performing a method according to an embodiment of the invention. The repair segment 15 has a geometry which matches the geometry of the repair cavity of the gear part of FIGS. 1-6. Accordingly, the repair segment 15 comprises three rounded contours 18 which match the rounded contours of the repair cavity, which were provided when the three through-going holes were drilled. Furthermore, two protruding portions 19 are provided. The protruding portions 19 fit into the recesses of the repair cavity, which were provided when the fastener openings were drilled.

The repair segment 15 further comprises three replacement teeth 16 being adapted to replace damaged teeth of a toothed rim, in the manner described above.

The protruding portions 19 are provided with openings 20 arranged to receive fasteners in order to attach the repair segment 15 to the gear part. Additional openings 21 are provided for receiving fasteners to engage with the additional fastener openings provided in the gear part.

The invention claimed is:

1. A method for repairing a gear part in a wind turbine, the gear part comprising a toothed rim, and the gear part defining an axis of circular symmetry, the method comprising the steps of:
    removing material from the gear part, including one or more damaged teeth of the toothed rim, by drilling one or more holes through the gear part along a direction which is substantially parallel to the axis of circular symmetry, thereby forming a repair cavity in the gear part,
    providing at least one fastener opening in the gear part by drilling one or more holes and/or one or more recesses in the gear part along a direction which is substantially parallel to the axis of circular symmetry,
    providing a repair segment having a geometry which matches a geometry of the repair cavity, the repair segment comprising one or more replacement gear teeth,
    arranging the repair segment in the repair cavity, and
    attaching the repair segment to the gear part by introducing one or more fasteners into the fastener opening(s).

2. The method according to claim 1, wherein the step of removing material from the gear part comprises drilling two or more holes through the gear part along a direction which is substantially parallel to the axis of circular symmetry, the two or more holes being arranged in abutment with each other or with an overlap, the two or more holes thereby forming a single repair cavity in the gear part.

3. The method according to claim 1, wherein the step of providing at least one fastener opening in the gear part comprises drilling one or more recesses in the gear part, said one or more recesses forming part of the repair cavity.

4. The method according to claim 1, wherein the step of providing at least one fastener opening in the gear part comprises providing a fastener opening having a first diameter and a recess having a second diameter, the second diameter being larger than the first diameter, the fastener opening and the recess being provided in a single drilling step, and the single drilling step being stopped when the recess has a predefined depth.

5. The method according to claim 1, further comprising the steps of:
   providing a jig comprising one or more guiding apertures,
   mounting the jig on the gear part in a region containing damaged gear teeth of the toothed rim, while aligning the jig with respect to undamaged gear teeth of the toothed rim,
   performing the steps of removing material from the gear part and providing at least one fastener opening in the gear part by drilling through the guiding aperture(s) of the jig, and
   removing the jig from the gear part after the steps of removing material from the gear part and providing at least one fastener opening in the gear part have been performed.

6. The method according to claim 1, further comprising the step of removing sharp edges from an inner surface of the repair cavity, by means of grinding or polishing, after the step of removing material from the gear part and prior to the step of arranging the repair segment in the repair cavity.

7. The method according to claim 1, wherein the step of removing material from the gear part is performed using an annular cutter drill bit.

8. The method according to claim 1, wherein the gear part forms part of a yaw system of a wind turbine.

9. The method according to claim 1, wherein the gear part forms part of a pitch system of a wind turbine.

10. A repaired gear part for a wind turbine, the gear part defining an axis of circular symmetry, comprising:
    a toothed rim,
    a repair cavity formed in the gear part, said repair cavity defining at least one rounded contour formed by a drill bit, and
    a repair segment mounted in the repair cavity and attached to the gear part by means of one or more fasteners, the repair segment having a shape and a size which matches the at least one rounded contour of the repair cavity, and the repair segment comprising one or more replacement gear teeth,
    wherein one of the one or more fasteners is aligned along a direction which is substantially parallel to the axis of circular symmetry.

11. The repaired gear part according to claim 10, wherein the repair cavity defines two or more rounded contours, each formed by a drill bit, the two or more rounded contours being arranged in abutment with each other or with an overlap.

12. The repaired gear part according to claim 10, wherein the at least one rounded contour(s) form(s) at least 50% of a surface of the repair cavity.

13. The repaired gear part according to claim 10, wherein the repaired gear part forms part of a yaw system of a wind turbine.

14. The repaired gear part according to claim 10, wherein the repaired gear part forms part of a pitch system of a wind turbine.

15. A jig for use in repairing a gear part in a wind turbine, the jig comprising:
    means for aligning the jig with gear teeth of a gear part to be repaired,
    at least one guiding aperture arranged for guiding a drill, and
    means for mounting the jig on a gear part to be repaired in a position where the guiding aperture(s) is/are arranged in a region comprising one or more damaged teeth of the gear part.

16. The jig according to claim 15, wherein the jig comprises at least two guiding apertures, the at least two guiding apertures being arranged in abutment with each other or with an overlap.

17. The jig according to claim 15, wherein the means for aligning the jig comprises a toothed rim arranged to be aligned with a toothed rim of a gear part, and wherein the means for mounting the jig on a gear part to be repaired is arranged to mount the jig in a position where the toothed rim of the jig is aligned with the toothed rim of the gear part.

18. The jig according to claim 15, wherein the at least one guiding aperture defines at least one rounded contour.

* * * * *